(12) United States Patent
Weingaertner

(10) Patent No.: US 6,585,889 B2
(45) Date of Patent: Jul. 1, 2003

(54) TRANSMISSION OIL PAN MODULE HAVING FILTER WITH INTEGRATED DRAIN PLUG

(75) Inventor: Juergen Weingaertner, Walled Lake, MI (US)

(73) Assignee: Federal-Mogul World Wide Inc., Southfield, MI (US)

(*) Notice: Subject to any disclaimer, the term of this patent is extended or adjusted under 35 U.S.C. 154(b) by 0 days.

(21) Appl. No.: 09/870,873

(22) Filed: May 31, 2001

(65) Prior Publication Data

US 2001/0047996 A1 Dec. 6, 2001

Related U.S. Application Data

(60) Provisional application No. 60/208,695, filed on Jun. 1, 2000.

(51) Int. Cl.[7] ............................................. B01D 35/027
(52) U.S. Cl. ..................... 210/172; 210/248; 210/435
(58) Field of Search ................. 210/168, 172, 210/248, 249, 312, 313, 435, 451, 454, 455; 184/6.24, 106

(56) References Cited

U.S. PATENT DOCUMENTS

| | | | |
|---|---|---|---|
| 1,305,355 A | | 6/1919 | Gulick |
| 1,587,800 A | | 6/1926 | Saives |
| 1,868,055 A | | 7/1932 | Edwards |
| 1,872,478 A | | 8/1932 | Marks |
| 1,874,585 A | | 8/1932 | Newcomb |
| 1,892,185 A | | 12/1932 | Clements |
| 2,010,430 A | | 8/1935 | Howard et al. |
| 2,306,823 A | | 12/1942 | Meldrum |
| 2,437,008 A | | 3/1948 | Van Doehren |
| 2,441,681 A | | 5/1948 | Werder |
| 2,462,819 A | | 2/1949 | Trail |
| 2,693,281 A | * | 11/1954 | Winzen ...................... 210/312 |
| 3,211,256 A | | 10/1965 | Teutsch |
| 3,211,291 A | | 10/1965 | Teutsch |
| 3,237,770 A | * | 3/1966 | Humbert, Jr. ............... 210/312 |
| 3,707,202 A | | 12/1972 | Dixon |
| 4,136,011 A | | 1/1979 | Joseph et al. |
| 4,264,443 A | | 4/1981 | Anderson et al. |
| 4,352,737 A | * | 10/1982 | Taniguchi ................... 210/455 |
| 4,402,827 A | | 9/1983 | Joseph |
| 4,930,469 A | | 6/1990 | Kamprath et al. |
| 5,099,954 A | | 3/1992 | Kikuchi et al. |
| 5,130,014 A | | 7/1992 | Volz |
| 5,259,953 A | * | 11/1993 | Baracchi et al. ............ 210/232 |
| 5,314,616 A | | 5/1994 | Smith |
| 5,476,582 A | | 12/1995 | Camping |
| 5,607,637 A | | 3/1997 | Beer et al. |
| 5,863,424 A | | 1/1999 | Lee |
| 6,013,179 A | | 1/2000 | Laughlin et al. |
| 6,058,898 A | | 5/2000 | Freese |

FOREIGN PATENT DOCUMENTS

| | | |
|---|---|---|
| DE | 1099794 | 2/1961 |
| DE | 1217799 | 5/1966 |
| DE | 1536800 | 3/1971 |
| DE | 3123269 A1 | 6/1982 |
| DE | 3830966 C1 | 5/1989 |
| DE | 4243217 A1 | 6/1994 |
| DE | 4242513 C2 | 2/1997 |
| DE | 19610414 A1 | 9/1997 |
| DE | 19735444 A1 | 1/1999 |
| DE | 19735445 C2 | 8/1999 |
| GB | 751500 | 6/1956 |
| GB | 2079168 A | 1/1982 |
| JP | 5224639 | 2/1977 |

\* cited by examiner

Primary Examiner—Matthew O. Savage
(74) Attorney, Agent, or Firm—Howard & Howard

(57) ABSTRACT

A transmission oil pan module includes an oil pan having a floor formed with a drain hole and side walls extending from the floor to provide a space for holding oil. A filter assembly includes a housing disposed in the space of the oil pan. A drain tube extends from the housing through the drain hole to a free end exterior of the oil pan. The drain tube has an oil inlet open to the space of the oil pan and is formed with an oil outlet adjacent the free end of the drain tube. A drain plug is removably disposed in the outlet for normally closing the outlet to retain the oil, and upon removal, permitting the oil from the pan to drain through the drain hole.

14 Claims, 2 Drawing Sheets

TRANSMISSION OIL PAN MODULE HAVING FILTER WITH INTEGRATED DRAIN PLUG

Figure 1:
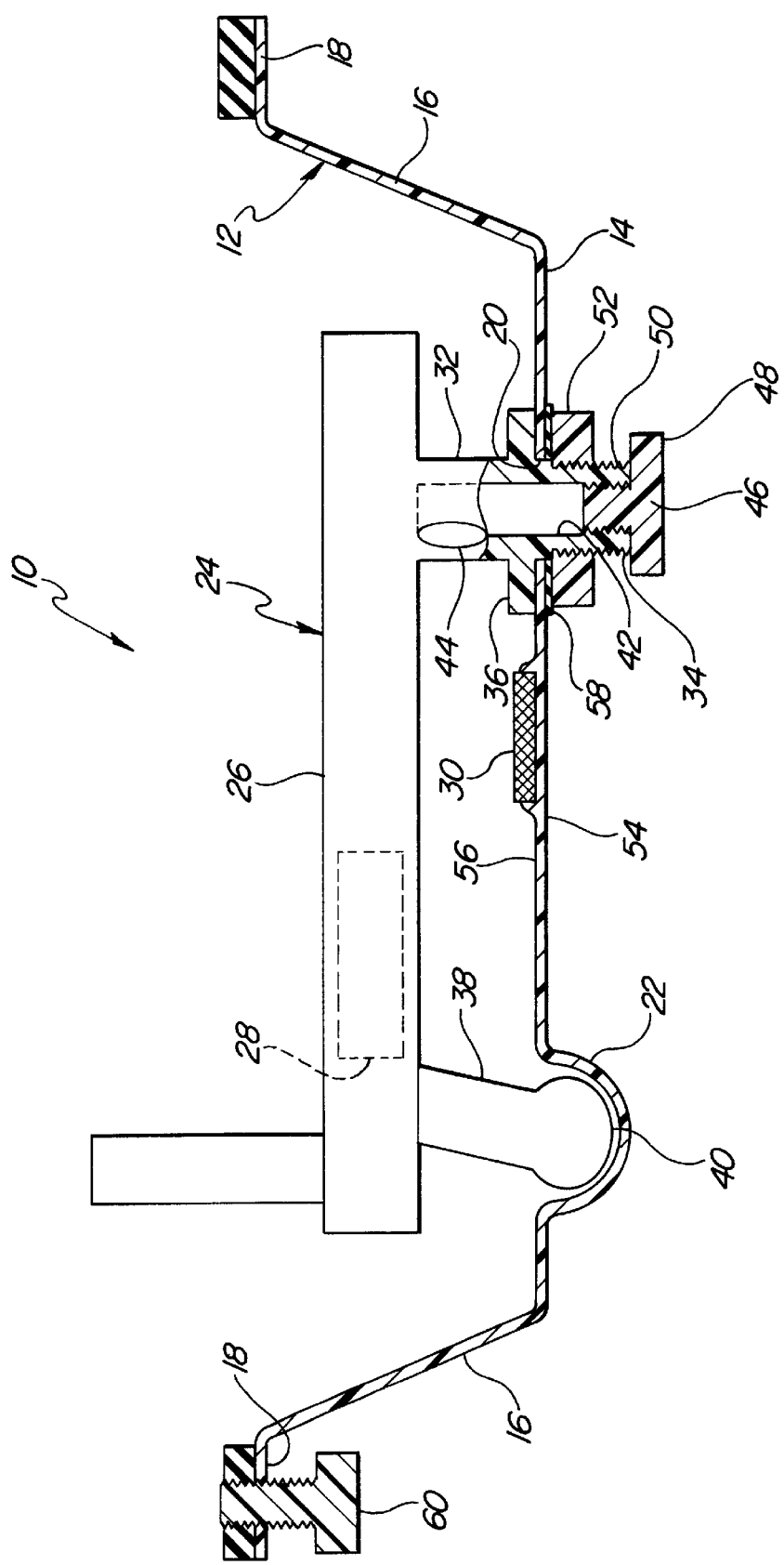

The disclosure incorporates the transmission oil pan module having filter with integrated drain plug disclosed in provisional patent application No. 60/208,695, filed Jun. 1, 2000, whose priority is claimed for this application.

BACKGROUND OF INVENTION

1. Technical Field

This invention relates to oil filter systems of the type accommodated within an oil pan, such as the transmission oil pan of a vehicle.

2. Related Art

It is common to locate the transmission oil filter for vehicles within the transmission oil pans. Replaceable-type filter modules are known. Such filter modules are typically used in combination with a conventional-type oil pan, made of plastic or metal, which is formed with a drain hole to allow for the drainage of the oil from the pan. The drain hole is typically threaded to receive a conventional drain plug. The oil drain system is separate from the filtration system. In such case, the manufacturer of oil pans is required to take additional steps in the manufacture of pans to accommodate the threaded drain plug.

It is an object of the present invention to filter/drain simply the manufacture of the overall system.

SUMMARY OF THE INVENTION AND ADVANTAGES

An oil pan module constructed according to the invention comprises an oil pan having a floor formed with a drain hole and side walls extending from the floor to provide a space for holding oil. A filter assembly is provided and includes a filter housing disposed in the space of the oil pan. A drain tube extends from the housing through the drain hole in the floor of the pan to a free end exterior to the oil pan. The drain tube has an interior drain passage formed with an oil inlet communicating with the space of the oil pan for admitting oil into the drain passage from the oil pan. The drain tube has an oil outlet adjacent the free end. A drain plug selectively closes the interior drain passage to block the oil from passing through the oil outlet when the drain plug is in a first closed position, and is movable to an open position for opening the interior drain passage to permit the oil to drain from the oil pan through the oil outlet of the drain tube.

The invention has the advantage of greatly simplifying the manufacture of oil pan modules, including simplifying the manufacture of the oil pan. Particularly, with the invention, there is no longer a need to perform additional operations on the basic oil pan in order to provided a threaded opening to accommodate a drain plug. A simple punched or bore drain hole opening is all that is needed. According to the invention, the draining features are formed as part of the filter assembly in the form of a drain tube which projects through the opening in the oil pan. In addition to providing selective drainage of the oil, the drain tube further has the advantage of providing support to the filter housing by acting, effectively, as a leg to locate and support the housing relative to the oil pan.

Incorporating the oil drain features as part of the filter assembly thus simplifies the manufacture of oil pans and provides for support and location of the filter assembly relative to the oil pan in a cost-effective manner.

THE DRAWINGS

Figure 2:
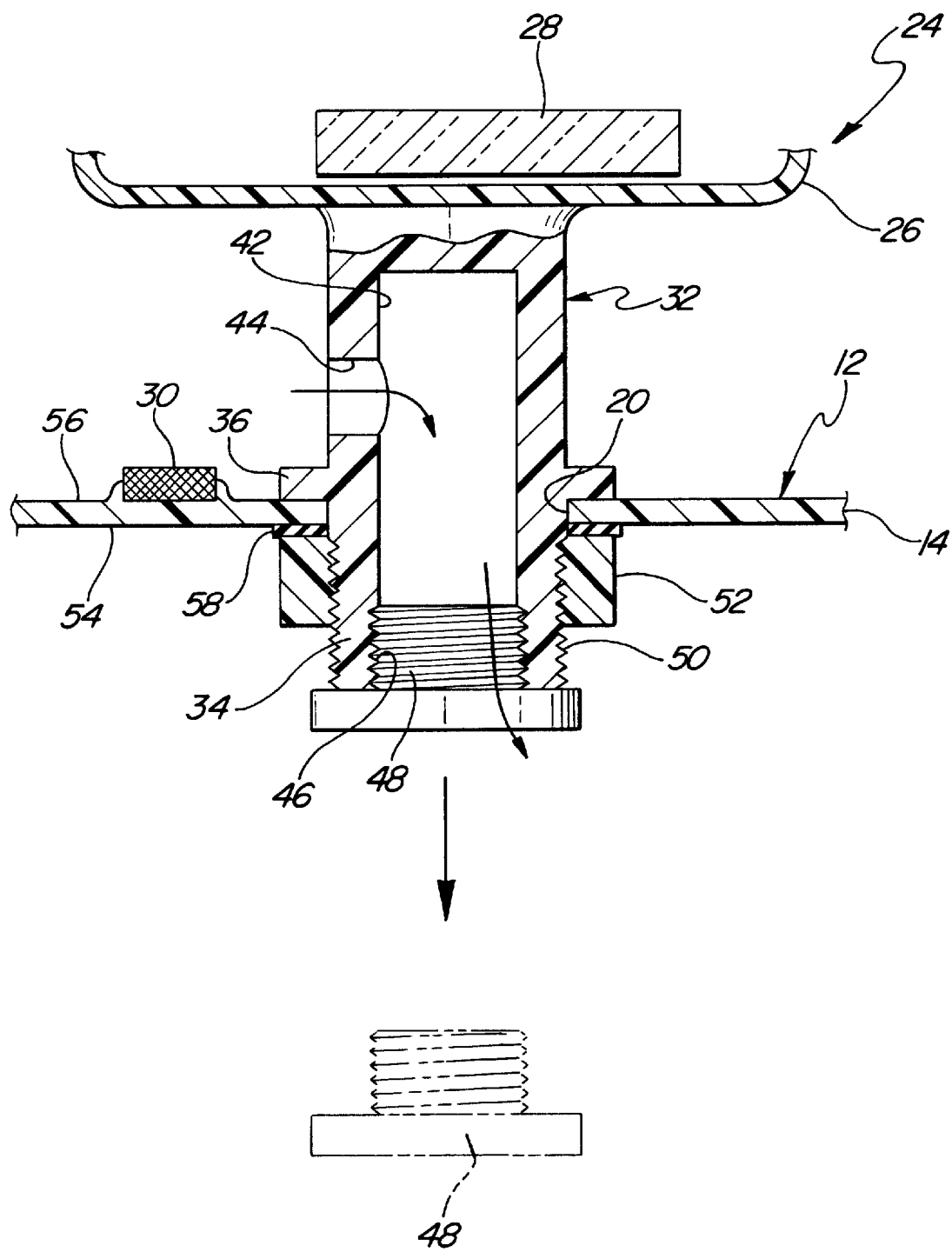

These and other features and advantages of the present invention will become more readily appreciated when considered in connection with the following detailed description and appended drawings, wherein:

FIG. 1 is a schematic elevational sectional view of an oil pan and filter system according to a presently preferred embodiment of the invention; and FIG. 2 is an enlarged schematic fragmentary sectional view showing additional features of the invention.

DETAILED DESCRIPTION

FIG. 1 shows a transmission oil pan module at 10 constructed according to the invention. The module 10 includes an oil pan 12 having a floor 14, side walls 16 and a peripheral mounting flange 18. The floor 14 is formed with an opening 20 and filter positioning features 22 which may comprise one or more recesses formed in the floor 14 of the oil pan 12, as illustrated. The oil pan 12 may be fabricated of stamped steel, plastics or other suitable materials.

The oil pan module 10 further includes a filter module subassembly 24, having a filter housing 26 fabricated of molded plastics material or the like within which is contained filter media 28, and a permanent magnet 30 which is preferably molded into the oil pan 12 for cleansing the transmission fluid within the oil pan 12 of debris and metallics as it passes through the filter module 24 (FIG. 2).

The filter module 24 has a drain tube 32 coupled at an upper end to the housing 26 and extending downwardly therefrom to a lower free end 34. The drain tube 32 is extendible through the opening 20 in the oil pan floor 14. The drain tube 32 has a flange or shoulder 36 which encircles the opening 20 on the interior side of the floor 14 to limit the extension of the drain tube 32 through the opening 20. The housing 26 may be further provided with one or more support legs 38 which extend downwardly from the housing 26 for supporting the filter housing 26 above the floor 14 of the oil pan 12. As illustrated in FIG. 1, the free ends 40 of the support legs 38 preferably cooperate with the positioning features 22 of the oil pan floor 14 to properly locate the housing 26 relative to the oil pan 12 when the drain tube 32 is extended through the opening 20.

FIG. 2 shows an enlarged cross section of the drain tube 32. The drain tube 32 has an interior passage 42 that communicates with an opening 44 in the wall of the tube 32 at a location within the oil pan 12 and extends therefrom downwardly to an opening 46 at the bottom of the tube exterior to the oil pan, providing a passageway for the drainage of transmission fluid from the oil pan through the drain tube 32.

The opening 46 at the bottom of the tube 32 is preferably formed with interior threads for accommodating a removable drain plug 48, which when installed, closes off the opening 46 for retaining the transmission fluid within the oil pan 12. The solid line position of the plug 48 illustrates the installed position, whereas the broken chain line position illustrates the removed condition of the plug 48. When it is desired to drain the transmission fluid from the oil pan 12, the plug 48 is simply removed, allowing the fluid to flow out of the oil pan 12 through the drain tube 32. The invention contemplates other means of retaining the drain plug removably within the opening 46 other than a threaded connection.

The exterior of the free end 34 of the drain tube 32 that extends beyond the floor 14 of the oil pan 12 is formed with exterior threads 50. A removable mounting nut 52 is threaded onto the extended free end of the drain tube 32 and tightened against the underside surface 54 of the oil pan floor 14, bringing the retention shoulder 36 on the inside of the oil pan into firm engagement with the inside surface 56 of the floor 14. In this way, the filter module 24 is firmly but releasably retained on the oil pan 12. A gasket or seal 58 may be provided between the nut 52 and floor 14 for sealing the opening 20 against the leakage of fluid.

Mounting bolts 60 are received in openings in the mounting flange 18 for mounting the completed module 10 to a transmission.

It will be appreciated that the components of the pan 12, filter 28, magnet 30, drain hole 42 and drain plug 48 may all be incorporated into a single prefabricated oil pan module 10 which may be simply mounted on a transmission.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. An oil pan module, comprising:

an oil pan having a floor formed with a drain hole and side walls extending from said floor to provide a space for holding oil; and a filter assembly including a filter housing disposed in said space of said oil pan, and a drain tube non-removably fixed to said housing and extending from said housing so that upon disposal of said filter housing within said space, said drain tube extends through said drain hole of said floor to a free end exterior to said oil pan, and upon removal of said filter housing from said space, said drain tube is removed from said space in fixed relation to said filter housing, said drain tube having an interior drain passage formed with an oil inlet communicating with said space of said oil pan for admitting oil from said oil pan into said interior drain passage and an oil outlet adjacent said free end, and a drain plug selectively closing said interior drain passage to block the oil from passing from said oil pan through said oil outlet when the drain plug is in a first closed position and being movable to an open position for opening said interior drain passage, to permit the oil to drain from said oil pan through said oil outlet of said drain tube.

2. The module of claim 1 wherein said oil inlet of said drain tube comprises at least one opening formed in a wall of said drain tube at a location interior to said oil pan.

3. The module of claim 1 wherein said drain plug extends into and closes said oil outlet when in said closed position.

4. The module of claim 3 wherein said drain plug and said drain tube have mating threads.

5. The module of claim 1 wherein said drain tube includes a flange engaging said floor of said pan about said drain hole of said pan on an interior side thereof.

6. The module of claim 5 wherein said drain tube supports a removable mounting nut threaded onto said drain tub and tightened against an exterior side of said floor of said oil pan.

7. The module of claim 6 including a gasket sealing said drain hole of said oil pan against oil leakage about said drain tube.

8. The module of claim 1 wherein said drain tube supports said housing spaced above said floor of said pan.

9. The module of claim 8 including at least one support leg extending from said housing in spaced relation to said drain tube and engaging said oil pan.

10. The module of claim 1 wherein said interior passage of said drain tube is closed to said housing.

11. The module of claim 1 wherein said housing and said drain tube are fabricated of plastics.

12. The module of claim 11 wherein said oil pan is fabricated of plastics.

13. An oil pan module, comprising:

an oil pan having a floor formed with a drain hole and side walls extending from said floor to provide a space for holding oil;

a filter assembly including a filter housing disposed in said space of said oil pan, and a drain tube extending from said filter housing through said drain hole of said floor to a free end exterior to said oil an, said drain tube having an interior drain passage formed with an oil inlet communicating with said space of said oil pan for admitting oil from said oil pan into said interior drain passage and an oil outlet adjacent said free end, and a drain plug selectively closing said interior rain passage to block the oil from passing from said oil pan through said oil outlet when the rain plug is in a first closed position and being movable to an open position for opening said interior drain passage, to permit the oil to drain from said oil pan through said oil outlet of said drain tube;

wherein said drain tube supports said filter housing spaced above said floor of said pan;

including at least one support leg extending from said filter housing in spaced relation to said drain tube and engaging said oil pan; and wherein said floor of said pan is formed with a locator feature for engaging and positively locating said at least one leg in a predetermined fixed position within said pan.

14. An oil pan module, comprising:

an oil pan having a floor formed with a drain hole and side walls extending said floor defining an opening at an upper surface of said oil pan and providing a space holding oil; and a filter assembly including a filter housing disposed in said space of said oil pan, wherein said filter assembly can be removed from said oil pan through said opening, and a drain tube extending from said housing through said drain hole of said floor to a free end exterior of said oil pan, aid drain tube supporting a removable mounting nut threaded onto said drain tube an tightened against an exterior side of said floor of said oil pan preventing removal of said filter housing from said oil pan even when said opening of said oil pan remains open and free from attachment to an adjoining structure.

* * * * *

UNITED STATES PATENT AND TRADEMARK OFFICE
CERTIFICATE OF CORRECTION

PATENT NO. : 6,585,889 B2  Page 1 of 1
DATED : July 1, 2003
INVENTOR(S) : Juergen Weingaertner It is certified that error appears in the above-identified patent and that said Letters Patent is hereby corrected as shown below:

Column 3,
Line 26, after "fixed to said" insert therein -- filter --.
Line 55, after "onto said drain" delete "tub" and insert therein -- tube --.

Column 4,
Line 19, after "exterior to said oil" delete "an" and insert therein -- pan --.
Line 51, after "oil pan," delete "aid" and insert therein -- said --.
Line 52, after "said drain tube" delete "an" and insert therein -- and --.

Signed and Sealed this

Tenth Day of February, 2004

JON W. DUDAS
*Acting Director of the United States Patent and Trademark Office*